(12) United States Patent
Sharma

(10) Patent No.: US 9,942,415 B2
(45) Date of Patent: Apr. 10, 2018

(54) TELECOMMUNICATION OFFLINE CHARGING SYSTEM

(71) Applicant: Alcatel-Lucent USA Inc., Murray Hill, NJ (US)

(72) Inventor: Ranjan Sharma, New Albany, OH (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 4 days.

(21) Appl. No.: 14/962,021

(22) Filed: Dec. 8, 2015

(65) Prior Publication Data
US 2017/0163818 A1 Jun. 8, 2017

(51) Int. Cl.
*H04M 11/00* (2006.01)
*H04M 15/00* (2006.01)

(52) U.S. Cl.
CPC ........... *H04M 15/65* (2013.01); *H04M 15/41* (2013.01)

(58) Field of Classification Search
CPC ............... H04M 2215/32; H04W 4/24; H04Q 11/0478; H04L 12/5602; H04L 47/10; H04L 47/215
USPC ............ 455/410–412.2, 414.3–414.4, 466, 455/405–406; 370/230–235, 389–394
See application file for complete search history.

(56) References Cited

U.S. PATENT DOCUMENTS

| | | | | |
|---|---|---|---|---|
| 8,958,306 | B2* | 2/2015 | McCann | H04L 63/0263 370/241 |
| 2011/0098066 | A1* | 4/2011 | Goermer | H04M 15/06 455/466 |
| 2011/0202614 | A1* | 8/2011 | Graig | H04L 63/0892 709/206 |
| 2011/0223882 | A1* | 9/2011 | Hellgren | H04L 12/14 455/406 |
| 2011/0275345 | A1* | 11/2011 | Cai | H04L 12/1403 455/406 |
| 2012/0163297 | A1* | 6/2012 | Agarwal | H04L 12/1425 370/328 |
| 2012/0210003 | A1* | 8/2012 | Castro | H04L 12/14 709/225 |
| 2012/0233323 | A1* | 9/2012 | Conte | H04L 12/14 709/224 |
| 2013/0091041 | A1* | 4/2013 | Sharma | H04L 67/1034 705/30 |
| 2014/0011472 | A1* | 1/2014 | Sharma | H04L 12/1403 455/406 |

(Continued)

*Primary Examiner* — Dai A Phuong
(74) *Attorney, Agent, or Firm* — Niraj A. Desai

(57) ABSTRACT

A Charging Data Function (CDF) unit of an Offline Charging System (OFCS) receives Accounting Charging Request (ACR) messages from Charging Trigger Functions (CTFs). The CDF stores ACRs in designated buckets based on the source CTF and its determined status. If there is no change in the status of the source CTF, the CDF continues to store ACRs as they are received in the designated bucket. If the source CTF status has changed (i.e., a reboot or restart has occurred), the CDF allocates a new bucket for the given CTF and stores ACR messages indicating the new status in the new bucket. In addition, the receiving CDF stops storing ACR messages in the previous bucket and deprecates it as being obsolete. The CDF processes the obsolete bucket to generate incomplete Charging Data Records (CDRs) for any ACRs for which complete CDRs cannot be generated.

16 Claims, 3 Drawing Sheets

(56) References Cited

U.S. PATENT DOCUMENTS

2015/0312743 A1* 10/2015 Sharma ................ H04M 15/65
                                                            455/406

* cited by examiner

TELECOMMUNICATION OFFLINE CHARGING SYSTEM

TECHNICAL FIELD

The present disclosure is directed towards communication systems, and in particular, to offline charging functions in telecommunication systems.

BACKGROUND

Telecommunication service providers typically provide numerous voice and data services to end users (also referred to as subscribers of a telecommunication network). Some examples of voice services include voice calls, call forwarding, call waiting, etc. Some examples of data services include messaging, streaming audio/video, Voice over Internet Protocol (VoIP), online gaming, and IP-TV. The data services are managed by a packet core network of a telecommunications provider, which interfaces the end user with external Packet Data Networks (PDN), such as the Internet. Some examples of packet core networks include General Packet Radio Service (GPRS) core network, an Evolved Packet Core (EPC) of a Long Term Evolution (LTE) network, etc. Mobile devices, such as cell phones, personal data assistants, smart phones, notebook computers, etc., may access the voice or data services of a telecommunication network via an over the air interface with one or more base stations.

Telecommunication service providers use offline and online charging systems to keep track of the resource usage incurred by each subscriber user device of the telecommunication network. The 3GPP/3GPP2 standards groups have defined a set of specifications that may be used to implement online charging systems and offline charging systems in the various network domains (e.g., a circuit-switched domain, a packet-switched domain, and/or a wireless domain), IP multimedia subsystems, and emerging 3G/OMA application services.

As provided in 3GPP TS 32.240, offline charging is defined as a process where charging information for network resource usage is collected concurrently with the resource usage. The charging information is passed through a chain of charging functions, which results in the generation of Charging Data Record (CDR) files that are transferred to the network operator's Billing Domain for subscriber billing and/or inter-operator accounting. To implement offline charging, a Charging Trigger Function (CTF) is implemented in a subscriber's user device such as a cell-phone, tablet, or other suitable end user network element configured to request and provide services to a subscriber via the telecommunications network. The CTF collects information pertaining to chargeable events associated with various services provided by the telecommunications network to the subscriber's user device, assembles this information into matching charging events, and sends the charging events to a Charging Data Function (CDF), which is part of the telecommunication provider's Offline Charging System (OFCS).

The CDF receives the charging events from one or more CTFs, and uses the information included in the charging events to construct CDRs. A CDR is a formatted collection of information about a chargeable event (e.g., time of call set-up, duration of the call, amount of data transferred, etc.) for use in billing and accounting. The CDF then sends the CDRs to a Charging Gateway Function (CGF) of the OFCS. The CGF acts as a gateway between the network and the billing domain. Therefore, the CGF collects CDRs from the CDF (and other CDFs), optionally correlates the CDRs and writes the CDRs into a CDR file, and makes the CDR file available to the billing domain.

Various causes may result in a stoppage of the reporting of the charging events from a CTF to a CDF. The cause may be a temporary problem, such as an intermittent communication problem between the subscriber's device or other network element and a base station interconnected with the telecommunication service provider's core network, or a more serious state-related problem, such as one which may result in a shutdown and subsequent reboot or restart of a network element implementing the CTF. The former communication problems are often resolved quickly, as the telecommunication network is monitored in real-time and telecommunication operators provide sufficient means for alternative path selection. However, the latter case which indicates an unanticipated restart or reboot of the CTF, remains an issue which causes significant processing strain on the resources of an OFCS in processing session (or event) accounting records.

BRIEF SUMMARY

In various aspects, systems and methods for processing session based charging messages in an offline charging system of a telecommunications services provider are provided.

In one aspect a system and method for processing Accounting Charging Record (ACR) messages in an Offline Charging System (OFCS) of a telecommunications network include receiving a first Diameter message for a telecommunication session from a first Charging Trigger Function (CTF) over the telecommunications network; identifying the first CTF as the source of the received first Diameter message and determine a first Origin State ID (OSI) reported by the first CTF from Address Value Pairs (AVPs) included in the first Diameter message; designating a first bucket for storing ACR messages received from the identified first CTF; setting the first OSI as a current OSI associated with the designated first bucket; and, storing the first Diameter message in the designated first bucket if the first Diameter message is an ACR message.

In one aspect, the system and method further include receiving additional ACR messages for one or more telecommunication sessions from the first CTF over the telecommunications network, each of the additional ACR messages including AVPs indicating the identity of the first CTF and an OSI reported by the first CTF; determining that the respective OSIs reported in the additional ACR messages are the same as the current OSI that has been associated with the designated first bucket for storing ACR messages received from the first CTF; and, storing the additional ACR messages received from the first CTF for the one or more telecommunication sessions in the designated first bucket.

In one aspect, the system and method further include determining that at least one of the additional ACR messages stored in the designated first bucket is an "Stop" ACR message for a given telecommunication session for which a "Start" ACR message and one or more "Interim" ACR messages are also stored in the designated first bucket; and, generating a complete Charging Data Record (CDR) using data included in the "Start" ACR message, the one or more "Interim" ACR messages, and the "Stop" ACR message stored in the designated first bucket for the given telecommunication session.

In one aspect, the system and method further include receiving a second Diameter message for a telecommunication session from the first CTF over the telecommunications network; identifying the first CTF as the source of the received second Diameter message and identify a second OSI reported by the first CTF from Address Value Pairs (AVPs) included in the second Diameter message; determining that the second OSI reported by the first CTF in the second Diameter message is different from the current OSI associated with the designated first bucket; designating a second bucket for storing ACR messages received from the first CTF; setting the second OSI received in the second Diameter message as a current OSI associated with the designated second bucket; and, storing the second Diameter message in the designated second bucket if the second Diameter message is an ACR message.

In one aspect, the system and method further include receiving additional ACR messages for one or more telecommunication sessions from the first CTF over the telecommunications network, each of the additional ACR messages including AVPs indicating the identity of the first CTF and an OSI reported by the first CTF; determining that the respective OSIs reported in the additional ACR messages are the same as the current OSI that has been associated with the designated second bucket for storing ACR messages received from the first CTF; and, storing the additional ACR messages received from the first CTF for the one or more telecommunication sessions in the designated second bucket.

In one aspect, the system and method further include designating the first bucket for storing ACR messages received from the first CTF as an obsolete bucket.

In one aspect, the system and method further include generating incomplete Charging Data Records for one or more telecommunication sessions based on data included in one or more ACR messages stored in the first bucket.

In one aspect, the system and method further include receiving and storing respective ACR messages received from different CTFs over the telecommunications network in different designated buckets, each of the respective different designated buckets being associated with each different CTF and being associated with an OSI reported by each different CTF in one or more ACR messages.

DETAILED DESCRIPTION

Figure 1:
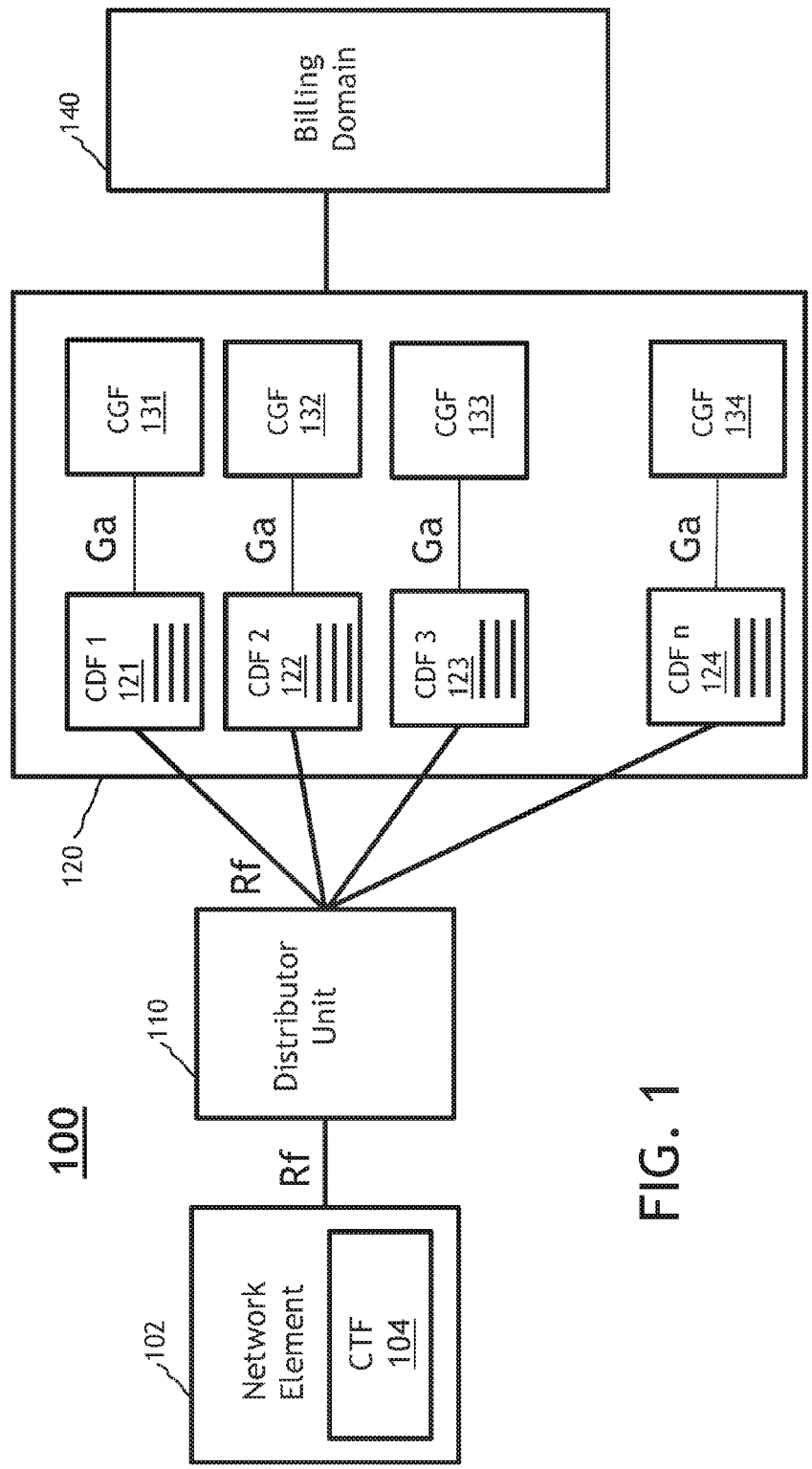
FIG. 1 illustrates an example embodiment of an offline charging architecture.

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Offline charging system provides the basis for post-paid billing for services rendered by telecommunication service providers, where subscribers are charged at the end of their billing cycle according to their usage of one or more services. Various network elements (NEs) with an integrated Charging Trigger Function (CTF), provide inputs to a charging data function (CDF) during subscriber sessions. These inputs, which are used for billing, are provided via ACRs (Accounting Requests) using the Diameter protocol (See: RFC 3588, 6733). ACRs are used for both session-related and event-related charging/accounting. ACRs, and their responses, ACAs, consist of a Diameter header and a number of AVPs (attribute-value pairs) data fields. ACRs are typically stored and processed in a DB maintained in the primary memory (RAM) accessible to one or more CDFs, but may also be stored in a disk storage.

For session-related charging, an Accounting Request Start message (ACR Start) and Accounting Request Stop message (ACR Stop) transmitted from the CTF to the CDF define the start and end of a particular service session. An ACR Start message commences session accounting at the CDF, and it may be followed by 0, 1 or more Accounting Request Interim messages (ACR Interim(s)) that denote a session heartbeat or a change in service (such as inclusion of a new CODEC in the session). The eventual arrival of an ACR Stop message announces the end of the session. The CDF is typically configured to generate a CDR upon the receipt of an ACR Interim (configurable) and a complete CDR when an ACR Stop arrives. As a part of generating the CDRs, the CDF also removes the constituent ACRs from the memory.

FIG. 1 illustrates an exemplary embodiment of an offline charging architecture 100 in accordance with various aspects of the disclosure. Architecture 100 may be implemented in a circuit-switched network or a packet-switched network that provides services to its subscribers (i.e., end user and associated User Equipment (UE)) to provide offline charging for the subscribers. Some exemplary networks include IP Multimedia Subsystem (IMS) networks, Long Term Evolution (LTE) networks, General Packet Radio Service (GPRS), etc.

Architecture 100 includes a network element 102 that connects to an offline charging system (OFCS) 120 through a distributor unit 110 (optional). A network element 102 is an apparatus or equipment used in the provision of services provided by a network. For example, in various embodiments a network element may comprise a subscriber device, a Serving-Call Session Control Function (S-CSCF), an application server (AS) of an IMS network, a Serving Gateway (SGW) or a Packet Data Network Gateway (PGW) of an LTE network, etc. Network element 102 includes a Charging Trigger Function (CTF) unit 104 that detects chargeable events for services provided by network element 102, assembles information for the chargeable events into matching charging events, and sends the charging events to a Charging Data Function (CDF) of the OFCS 120. In the case of network element 102, CTF 104 uses a Diameter Rf interface. Therefore, CTF 104 assembles the charging information into accounting requests, such as one or more Diameter Rf Accounting Request messages (ACRs). Although one CTF 104 is illustrated in FIG. 1 for simplicity, in typical applications there can be many CTFs ($104_1 \ldots 104_N$).

OFCS 120 is an apparatus, a server, a device, or a collection of processing equipment configured to implement offline charging for sessions or services provided by a telecommunications network. Offline charging can be of two types: session based or event based. In event based charging (i.e., session-less charging), the CTF reports the usage or the service rendered where the service offering is rendered in a single operation, such as subscriber registration, re-registration, de-registration, etc. The CTF reports session-less events in an Accounting Request Event message (ACR Event). Session based charging is the process of reporting usage reports for an entire service session that is provided over a duration of time. The CTF reports session messages as ACR Start, ACR Stop, and ACR Interim messages that denote the start, end, and interim session accounting data for charging for the type and duration of the session. During a session that starts with an ACR Start message and ends with an ACR Stop message, the CTF may transmit multiple ACR Interim messages depending on the proceeding of the session.

As shown in FIG. 1, OFCS 120 includes a plurality of CDFs (CDF1-CDFn) 121-124. A CDF comprises a processing apparatus, unit, or module within OFCS 120 that receives charging events for one or more sessions from one or more CTFs, and stores the charging events in one or more buckets (shown as horizontal lines in CDFs). The CDF further processes the charging events to generate one or more CDRs for the sessions, and sends the CDRs to one or more Charging Gateway Functions (CGFs 131-134). A CGF comprises a processing apparatus, unit, or module within OFCS 120 that correlates CDRs for a session, and forwards a CDR file with the correlated CDRs to a billing domain 140. Billing domain 140 is the part of the operator network that receives and processes the session correlated CDR files for billing mediation and other billing applications (e.g., statistical applications). CDFs 121-124 in OFCS 120 communicate with CGFs 131-134 over a Diameter Ga interface. In the case shown in FIG. 1, GTP' is used on the Ga interface to transport CDRs from the CDFs to the CGFs. While a 1:1 relationship is shown between CDFs 121-124 and CGFs 131-134 in FIG. 1, an N:1 relationship is also possible. Although not specifically illustrated in FIG. 1, OFCS 120 may include one or more processors or other hardware components that implement CDFs 121-124 and CGFs 141-144.

Distributor unit 110 is an optional component that may be implemented between CTFs (e.g., CTF 104) and the CDFs 121-124 in OFCS 120. The purpose of distributor unit 110 is to distribute Diameter requests or accounting requests (e.g., ACRs) from CTFs to the multiple CDFs 121-124 within OFCS 120. In this embodiment, distributor unit 110 is configured for communicating via Diameter Rf protocol or another type of protocol. Although distributor unit 110 is illustrated as being outside of OFCS 120, distributor unit 110 may be implemented on the same platform as OFCS 120.

Where OFCS 120 is implemented using a blade system architecture, for example, any or all of the distributor unit 110, CDFs 121-124, and CGFs 131-134 may be implemented to execute on respective blades (or servers) of a server chassis, where each blade includes physical computing resources such as a processor, memory, input/output devices, or other components typically found in computing devices. One or more message queues (not shown) may be implemented on the blades to provide a queue message communication interface between the components of the OFCS 120, such as, by way of example only, the distributor unit 110 executing on one of the blades of the server chassis and one or more CDFs executing on other respective blades of the server chassis.

The task of distributing Diameter requests may include considering the weights, current load index, and other parameters of CDFs 121-124 to select a destination CDF instance for handling ACRs for a particular session. Distributor unit 110 may follow a round-robin strategy in selecting a queue 150 associated with a selected destination CDF for a particular session. Distributor unit 110 may work as a Back to Back User Agent (B2BUA), where Diameter sessions associated with a particular CTF are terminated on distributor unit 110, and equivalent and corresponding Diameter sessions are started between distributor unit 110 and a selected destination CDF 121-124. Each CTF 104 may have established a Diameter connection with distributor unit 110, and send a Diameter ACR to distributor unit 110 that includes a Diameter "SessionId". The Diameter "SessionId" is unique for the CTF for each session it reports.

The distributor unit 110 may be configured to use a distribution algorithm to distribute ACRs associated with particular ACR Sessions to particular CDFs. A distribution algorithm comprises any set of rules for determining a destination CDF for ACRs for particular sessions. In one embodiment, distributor unit 110 may use a "consistent hashing" algorithm to select a destination CDF for a particular Diameter session. The consistent hashing algorithm may use "SessionId" information included in the ACRs (e.g., Diameter requests) to select the destination CDF and queue for a given Diameter request. For example, with n CDFs present each providing an m number of interfaces to CDFs 121-124, the consistent hashing algorithm may generate M numbers for a given Diameter "SessionId", where M may be n times m. The destination CDF and associated with the highest of the numbers may be chosen for processing CDRs of the Diameter session.

As noted previously, various scenarios may result in a stoppage of the reporting of the charging messages for one or more sessions from a given CTF to a CDF. Where the disruption is minor such as an intermittent communication problem or congestion between a network element implementing the given CTF and a base station or other interface interconnected with the telecommunication service provider's core network, the issue may be resolved such that the session charging messages for ongoing sessions may resume and then normally terminate with an eventual ACR Stop message from the CTF to the CDF without material change. However, a more substantive disruption may cause a network element that implements the CTF to physically reboot, reset, or restart. In such situations, the information as to the ongoing sessions may be lost at the CTF. As a result, the CTF that experienced the restart may not be able to resume session charging messages for ongoing sessions at the time of the disruption, and the CTF may establish new sessions that are then reported to the CDF via one or more ACR start messages. The result of such disruption may be that the CDF receives ACR Start and one or more ACR Interim messages for one or more sessions from a given CTF prior to the disruption, and, once the session information is lost at the given CTF, does not receive any further ACR Interim messages or the eventual ACR Stop message marking the end of those ongoing sessions from that CTF.

From the CDF perspective, the task is to determine the ongoing sessions that were started prior to the disruption that caused a restart at a given CTF and which will not be completed normally with an eventual reception of an ACR stop message from the given CTF due to the restart, and, to generating incomplete CDR's for those ACR messages for the identified ongoing sessions that were reported by the given CTF prior to the disruption. With tens or hundreds of thousands, or even millions, of accounting sessions typically in progress at any time and with limited CDF resources, completion of this task currently requires significant processing and resource usage at the OFCS.

Conventionally, the task identified above is handled in part at a CDF with use of a timer. In particular, the frequency at which a CTF sends an ACR Interim message to a CDF of the OFCS 120 is controlled by a value set in an Address Value Pair field (AVP) called Acct-Interim-Interval (AII). The value is set in seconds, and typical usage is to set this to equivalent of 10 or 15 minutes. If the call/session characteristics change, the NE/CTF immediately reports it without regard to the AII. If a CDF (e.g., CDF 121) of the OFCS 120 notes the absence of ACR Interims for a specific session (or a set of sessions) allocated to that CDF for a period of time that typically exceeds AII by a predetermined threshold, then it is likely that the session reporting has stopped due to a potential status change at the NE/CTF (e.g., a restart or reboot) or a disruption between the NE/CTF and the CDF. For example, in a typical embodiment each of the CDFs may be configured to wait for a predefined period of time, such as 3 times the value set in AII, before generating incomplete CDRs for all ongoing sessions from the particular NE/CTF for which an ACR interim has not been received during the waiting time period (e.g., due to a restart or reboot). This may mean that sessions whose accounting has stopped being reported to the OFCS for a period greater than 3*AII causes the CDF to process and purge those records from memory.

More particularly, when a CDF of the OFCS 120 first receives an ACR Start message from a given CTF for a particular session, the CDF can set a timer. If the CDF receives an ACR Stop message for one or more sessions from the given CTF before expiration of the timer, then the CDF may close the CDR for the sessions to generate a full or complete CDR. If the CDF does not receive an ACR Stop message from the given CTF before the expiration of the timer (e.g., due to a restart of the CTF as described above) for one or more sessions, then the CDF may close the CDR to generate an incomplete CDR for the sessions. Furthermore, the CDF may then open new CDRs for the same sessions if it subsequently receives additional ACR messages for those sessions from another CTF. This situation may happen, for example, where there is redundancy built into the system 100 with backup or spare CTF's that may continue reporting on the ongoing sessions when the given CTF that started the session reboots or restarts due to a disruption. The CDF may continue to generate incomplete CDRs when the timer expires, while producing more incomplete CDRs for the sessions being reported by a CTF.

The typical design choice is to let the AII-related record expiration to take place. This means that a typical OFCS 120 is configured to wait for a period that is set to 3 times the AII value, or 45 minutes for an AII value of 900 seconds. However, the lazy auditing algorithm that follows the 3*AII value is at odds with the near real-time CDR generation requirements. It is desirable for the OFCS to generate CDRs in under a minute after a CDR generation trigger has arisen but it is difficult to meet this expectation when a reboot or restart at a given CTF potentially impacts a large number of sessions.

In addition to the use of a timer at the CDF to detect the necessity to generate incomplete CDRs for one or more ongoing sessions reported by a given CTF, a given CTF that has recently rebooted or restarted may itself inform the CDF of a change in its status in a Diameter message. For example, the CTF may inform the CDF of its current status by populating fields in a Diameter message such as a Capabilities Exchange Request (CER) message that is transmitted from the CTF to the OFCS during initial handshake. Furthermore the CTF may also inform the CDF of its current status using an optional Address Value Pair (AVP) field provided in an ACR message transmitted by the CTF to the CDF. Thus, a change in the status of a source CTF may be determined by comparing new status information in a recent CER message or ACR message with previous status information reported in previous CER or ACR messages from the same source CTF. A determined change in the reported state of an NE/CTF communicated to a CDF of the OFCS 120 indicates that the session accounting messages reported to the CDF for sessions previous to the change in the state will not be continued. This may connote to the CDF that ACRs for all previous sessions from this NE/CTF can now be processed to generate (incomplete) CDRs. The AVP used to indicate the status of the CTF is the Origin-State-Id (OSI) AVP, which is typically populated with an unsigned 32 bit integer to provide the current status of the CTF. Typical implementation use monotonically increasing numbers to be put in this OSI AVP and the increments are performed at each reboot of the NE/CTF.

Neither of these the two approaches (i.e., the timer based approach or the OSI AVP based approach) as typically implemented, alleviates resources demands at the CDF. This is because when the timer expires, or even where the Origin-State-Id value for a given NE/CTF changes, the CDF conventionally stills needs to find and process all records for ongoing sessions that originated from the given NE/CTF prior to the change in its state. This is a memory or DB-intensive activity which would stall the system for a period of time because of two specific problems. First, the Diameter messages such as the CER and the ACR are variable length binary records and second, since the position of Origin-State-Id within the Diameter message is not fixed, its position can vary and come anywhere after the required Diameter header+fixed position AVPs.

Furthermore, under the standards, the Origin-State-Id is an optional AVP with no fixed position. For example, there is no obligation on NE/CTF to populate this AVP in an ACR in any particular order, or at all. Therefore, searching records of a large DB for ACRs for ongoing sessions that came from an NE/CTF that has since undergone a change in the state becomes a full record parsing exercise to find whether the OSI was provided and its location within the records (which may vary). In this mode, the CDF would have to examine each ACR record in its DB, determine and match the source CTF of the record (Origin-Host, Origin-Realm) with the source CTF of the received Diameter message that indicates a change in the Origin-State-Id, and then search every field in each matched record to identify if any field in the matched record includes and indicates an older Origin-State ID to be able to finally generate incomplete CDRs for those records.

The situation is further exacerbated by the fact that the OFCS 120 typically maintains the DB indexed by the accounting session identifier, and ACRs are inserted into the DB as they come from specific NE/CTFs, thereby losing the chronological sequence. Since the session-id is used as the index, the chronological sequence of records cannot be obtained by using this indexed table. Therefore, it is not possible for an implementation to treat all records within its database prior to record number 'X' as records belonging to the older OSI and records subsequent to record number 'X' as records belonging to the new OSI; the OFCS necessarily has to parse each variable length binary record to extract the OSI value. Now assuming a network element CTF designated as "CTF-1" sends a ACR record indicating a new Origin-State-Id as "N" due to a unforeseen restart or reboot, the task at the OFCS 120 becomes for the CDF to identify all records coming from "CTF-1" with an Origin-State-Id value smaller than "N". In effect, it may come down to identifying records received during Origin-State-Id value of "N−1" because it can reasonably be assumed that smaller values such as "N−2", "N−3" etc. will have already triggered appropriate origin-state change related processing in the past. However, the CDF may have to spend tens of minutes sifting through 70 million records—a typical value on a single blade implementation. A similar situation occurs with the timer based approach.

In more practical implementations, each OFCS 120 may be implemented to have up to 24 blades, each of which may host millions of records. A reported change in Origin-State-Id may induce a search through all blades in parallel, to preserve system resources (memory in this case), and as a result, may exhaust or strain different system resources (CPU and DB R/W throughput). Trading one bottleneck with another is an undesirable solution, and the system performance may suffer in either case due to different reasons.

Typical OFCS implementations are engineered to handle N million sessions concurrently, with a near real-time CDR generation. When an NE/CTF indicates a change in OSI, it indicates all older sessions to be discontinued and in their place, the NE/CTF is then configured to provide new sessions. In a network deployment, with sparing arrangement, the network may implement a failover, and all of the sessions that were running on the NE/"CTF-1" could be continued and reported by one or more sparing NE/CTFs. In such failover situations, the sessions may not be lost because the NE/"CTF-1" is rebooting since the sessions may be able to be continued by a backup CTF. The backup CTF may report the ongoing sessions, however, with different Diameter Session Ids and different Origin-Realm/Origin-Host combination to the same (or different) CDF that has the records with previous OSI still in its memory. However, if the OFCS does not process and generate incomplete CDRs for sessions associated with the older OSI of NE/"CTF-1", the OFCS would still experience a block of its memory resources and may eventually experience an overload when trying to accommodate the same sessions being reported by other NE/CTFs that back up NE/"CTF-1". Since the amount of memory (and amount of other computing resources) is finite at OFCS, holding on to sessions that are no longer being reported creates a resource hole.

The present disclosure provides an alternate solution to processing ACRs received from a CTF and identifying and generating CDRs for the ACRs based on the Origin-State Id's. In contrast to conventional implementations, the systems and methods disclosed herein may significantly reduce the time and demand on resources of a CDF of an OFCS (such as OFCS 120) when a particular CTF (e.g., CTF 104) reboots or restarts due to a technical problem.

Figure 2:
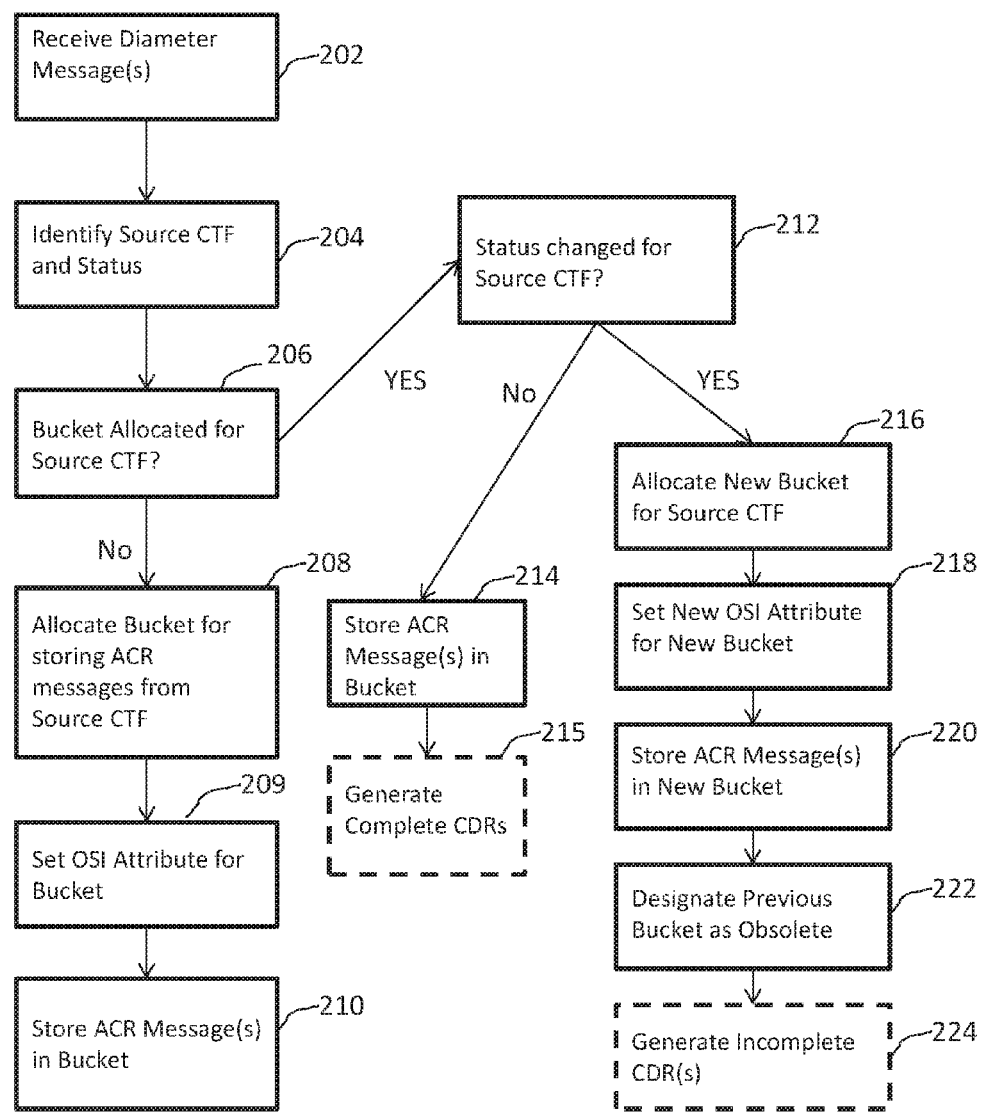
FIG. 2 illustrates an example process for processing session based messages in accordance with various aspects of the disclosure.

FIG. 2 illustrates an exemplary process 200 in accordance with various embodiments of the present disclosure that addresses the issues above. In particular, the steps illustrated in process 200 which are described in conjunction with offline charging architecture 100 of FIG. 1, provide a system and methodology that enable conservation of resources at the OFCS by providing easy association of ACR records for given sessions that are received from a given CTF that is associated with a Origin-State ID. The present disclosure may advantageously avoid having to parse multiple (e.g., thousands or millions) of records to extract the Origin-State-Id from any variable location within a received ACR to compare against the Origin-State-Id in the latest ACR from a NE/CTF, enable early recognition of change in the state of an NE/CTF and processing of change in the state of the OSI and, enable efficient identification, processing, and generation of incomplete CDRs for ACRs associated with stale OSIs.

The steps of process 200 will be described with reference to the CDFs 121-124 of the OFCS 120 illustrated in FIG. 1, but those skilled in the art will appreciate that process 200 may be performed in other systems or units. Furthermore, while particular steps are described in a particular order in FIG. 2 for enabling the reader to more easily understand the various aspects and principles of the disclosure, it will be readily apparent from the description below that in other embodiments additional steps may be added, or certain steps may be modified, combined, performed in a different order, or omitted, as will be understood by those skilled in the art. Furthermore, the terms "first", "second" etc. are used below to denote different messages, and are not necessarily indicative of a particular order.

To begin, it is assumed that a CTF 104 detects chargeable events for a session based service provided by a network element 102 (see FIG. 1). The CTF 104 assembles information for the chargeable event into a Diameter Rf ACR (e.g., Diameter request) for a Diameter session. The type of accounting for the service is further assumed to be session based, so a CTF 104 may insert a "START" value in the Accounting-Record-Type AVP of the ACR for new sessions, and insert an "INTERIM" or a "STOP" value in the Accounting-Record-Type AVP of the ACR for subsequent chargeable events for the sessions. CTF 104 then sends the ACR (i.e., Diameter Rf Accounting Request or Diameter request) to the distributor unit 110. It is further assumed that the distributor unit 110 receives ACRs for sessions from different CTFs 104, and distributes the ACRs to CDFs 121-124 of the OFCS 110, based on, for example, session IDs of the ACRs and other considerations described above, for further processing of ACRs for particular sessions from particular CTFs by particular CDFs.

Turning now to process 200 of FIG. 2, in step 202 a receiving CDF (e.g., one of CDFs 121-124) receives one or more Diameter messages from one or more CTFs (e.g., one or more CTFs 104) either directly or via the optional distributor unit (e.g., distributor unit 110) illustrated in FIG. 1. The received Diameter messages may include both CER messages and ACR messages that are received from a given CTF.

In step 204, the receiving CDF identifies the source CTF that transmitted the Diameter messages received by the CDF and the status of the respective source CTFs at the time the Diameter messages were transmitted. In an exemplary embodiment, the receiving CDF may determine the identity of the source CTF (e.g., "CTF-1", "CTF-2", . . . , "CTF-n") for each of the received Diameter messages from one or more values populated by the source CTF in one or more header fields or fixed AVPs of the received Diameter messages (typically, Origin-Realm and Origin-Host AVPs). Furthermore, the receiving CDF may also parse one or more AVPs of the each of the received Diameter messages to determine the respective current status reported by its source CTF at the time the Diameter messages were transmitted. For the purposes of explaining aspects of the present disclosure and process 200, it is assumed that the source CTFs report their current status by populating the OSI AVP with values (e.g., "OSI-1", "OSI-2", . . . , "OSI-m") within the Diameter messages that are transmitted by the source CTFs and received by the receiving CDF (though it is not strictly necessary to receive an OSI value in every Diameter message, as long as new OSI values are reported when they occur). It is also assumed that the OSI AVP is received from the source CTF in a CER message, in an ACR message, or both.

In step 206, the receiving CDF determines whether a respective bucket (i.e., a data structure) has been allocated for storing ACR messages received from respective source CTFs.

For example, the receiving CDF may determine in step 206 that a respective bucket has not yet been allocated for a respective source CTF that is identified in an ACR message (or a CER message) received by the receiving CDF. By way of a specific example, assume that the receiving CDF has received a first Diameter message from a given source CTF from which the receiving CDF identifies "CTF-1" as the source CTF and "OSI-1" as the OSI status of "CTF-1" at the time the first Diameter message is transmitted (step 204). The received first Diameter message may be an ACR message (e.g., a first ACR message), or a first CER message (e.g., a first CER message). The receiving CDF may determine in step 206 that a respective bucket has not yet been allocated for "CTF-1" and, in step 208, the CDF designates (or allocates) a new bucket (e.g., "Bucket-1") for storing ACR messages received from "CTF-1". In addition, in step 209, the CDF also sets a current-OSI attribute value of the new "Bucket-1" to the OSI value of "OSI-1" reported by "CTF-1" in the first Diameter message. Next, in step 210, if the first Diameter message is an ACR message (e.g., a first ACR message) the CDF stores the first ACR message received from "CTF-1" into "Bucket-1" for which the current-OSI attribute has been set to "OSI-1". Alternatively, if the first Diameter message is a first CER message, the bucket is allocated as above for storing ACR messages from the source CTF but the CER message is not stored in the allocated bucket since it is not an ACR message.

Alternatively, in step 206, the receiving CDF may determine that a respective bucket has already been allocated for a respective source CTF that is identified in a Diameter message received by the receiving CDF. Again by way of a specific example, assume that the receiving CDF has received an additional Diameter message from the given source CTF (e.g., a second ACR message or a second CER message), and the receiving CDF identifies "CTF-1" as the source CTF of the additional Diameter message. In this case, the receiving CDF may determine in step 206 that the respective bucket (i.e., "Bucket-1") for "CTF-1" has already been allocated and proceed to step 212.

In step 212, the receiving CDF determines whether or not there has been a change in the status of the source CTF from which one or more additional Diameter messages have been received. Notably, the receiving CDF may determine whether or not there has been a change in the status of the source CTF by comparing the current-OSI attribute set for the respective bucket allocated to the source CTF with the OSI AVP value reported by the source CTF in the additional Diameter messages that are received from the source CTF at the receiving CDF, and without having to search through the records of the stored ACRs in the bucket.

By way of continuing the specific example, as before, assume that an additional Diameter message is received from the source CTF "CTF-1" (for which "Bucket-1" has already been allocated), which indicates "OSI-1" as the OSI status of "CTF-1". In this case, the receiving CDF may determine that there has been no change in the status of "CTF-1" since the OSI AVP value of the additional Diameter message ("OSI-1") is the same as the current-OSI attribute value ("OSI-1") set or assigned for "Bucket-1" based on previously received ACR or CER messages from the source CTF. Since the receiving CDF has determined there has been no change in the status of "CTF-1", and if the additional Diameter message is an ACR message (e.g., a second ACR message), the receiving CDF may store the new ACR message received from "CTF-1" into "Bucket-1" in step 214. Similarly, the receiving CDF may continue to save all additional new ACR messages received from "CTF-1" into "Bucket-1" for which the receiving CDF determines that the OSI status of "CTF-1" has not changed based on the comparison between the OSI AVP values reported in the additional ACRs and the current-OSI attribute set for "Bucket-1".

Returning to step 212, the receiving CDF may alternatively determine that there has been a change in the status of the source CTF (i.e. a restart or reboot has occurred) from which one or more additional Diameter messages have been received. Continuing the previous example, assume that a yet another additional Diameter message (e.g., a third ACR message or a third CER message) is received at the receiving CDF. The receiving CDF processes the additional Diameter message and identifies "CTF-1" as the source CTF (for which "Bucket-1" has already been allocated) but also determines that the OSI status of "CTF-1" is indicated as "OSI-2". In this case, the receiving CDF may determine that there has been a change in the status of "CTF-1" since the OSI AVP value of the third ACR message ("OSI-2") is different than the current-OSI attribute value ("OSI-1") set for "Bucket-1". Based on the determination of the difference in the OSI, the receiving CDF may determine that "CTF-1" has restarted or rebooted due to some cause such as a disruption.

When a determination is made in step 212 that there has been a change in the status of the source CTF, the process may go to step 216 and 218, in which the receiving CDF allocates a new bucket for storing ACR messages received from "CTF-1" (step 216), and sets the current-OSI attribute of the new bucket to the new OSI AVP value indicating the change in status of the source CTF (step 218). Continuing the previous example, upon determining that there has been a change in the status of "CTF-1" based on the additional Diameter message, the receiving CDF allocates a new bucket (e.g., "Bucket 2"), and sets the current-OSI attribute of "Bucket 2" to "OSI-2" (the value indicated in the OSI AVP in the third ACR message from "CTF-1").

In step 220, if the additional Diameter message is an ACR message (e.g., a third ACR message), the receiving CDF stores the third ACR message in the new bucket ("Bucket 2"). As described previously with respect to step 214, the receiving CDF may then continue to store additional new ACR's that are received from "CTF-1" into "Bucket 2" as long as the OSI AVP value is determined to remain the same ("OSI-2").

In step 222, the receiving CDF designates the prior bucket designated for storing ACR messages from the source CTF as being obsolete. Continuing the prior examples, the receiving CDF may designate "Bucket-1" as being obsolete such that no additional ACR messages received from "CTF-1" are stored in obsolete-Bucket 1 due to the determined changed status of "CTF-1".

A number of advantages may be apparent from the description of process 200 above. To begin, a receiving CDF (e.g., CDF 121-124) allocates separate buckets for storing ACR messages received from separate source CTFs. Each bucket is allocated or assigned with a current status value (i.e., OSI) of the respective CTF, as reported in a CER message from a source CTF or an ACR message from the source CTF. Each bucket is also identified with its source derived, for example, from the Origin-Realm, Origin-Host AVPs that identify a CTF. Furthermore, as long as the receiving CDF determines that there is no determined change in the status value of a given source CTF from which it has received Diameter messages, the receiving CDF continues to store ACRs as they are received from the source CTF in its respective current bucket. When ACR interim or ACR stop messages are received for one or more sessions and stored in the designated current bucket, the receiving CDFs generates complete CDR's (shown using a dashed box in step 215 of FIG. 2) for these sessions and provides the complete CDRs to a CGF (e.g., CGF 131-134) for eventual reporting to billing domain 140. The receiving CDF then deletes the ACRs from the current bucket for which such CDRs have been generated and transmitted to the CGF.

When the receiving CDF determines that the status of a given source CTF has changed (i.e., a reboot or restart has occurred at the CTF as indicated by a change in OSI value in a Diameter message), the CDF allocates a new bucket for the given source CTF and stores subsequent ACR messages associated with the new status value in the new bucket. In addition, the receiving CDF stops storing ACR messages in the previous bucket and deprecates it as being obsolete. In other words, the new bucket allocated for the given source CTF becomes the current bucket for storing and processing ACR messages received from a given source CTF after a determined status change, and the prior bucket allocated to the given source CTF becomes an obsolete bucket. The CDF then processes the obsolete bucket to generate incomplete CDR's (shown using a dashed box in step 224 of FIG. 2) for any ACRs for which complete CDRs cannot be generated due to the restart of the source CTF and transmits the generated incomplete CDRs to the CGF for reporting to the billing domain.

In contrast to typical implementation, neither determining whether a change in status at a given CTF has occurred (i.e., determining that the CTF has restarted) or identifying records from the given CTF for which incomplete CDRs are to be generated, requires searching through records for the ACRs that have been processed and stored in a bucket previously. Rather, the change in the status of the given source CTF may be determined by a simple comparison between the current OSI-attribute value assigned to the bucket and the OSI AVP value indicated in a newly received ACR or a new CER from the given source CTF. Further, there is no need to search through the fields of the (many) ACRs that have been previously stored in the bucket to determine those ACRs for which incomplete CDRs are to be generated due to the change in the status of the given source CTF, because such records are isolated within the designated obsolete bucket for the given source CTF in accordance with the present disclosure.

Figure 3:
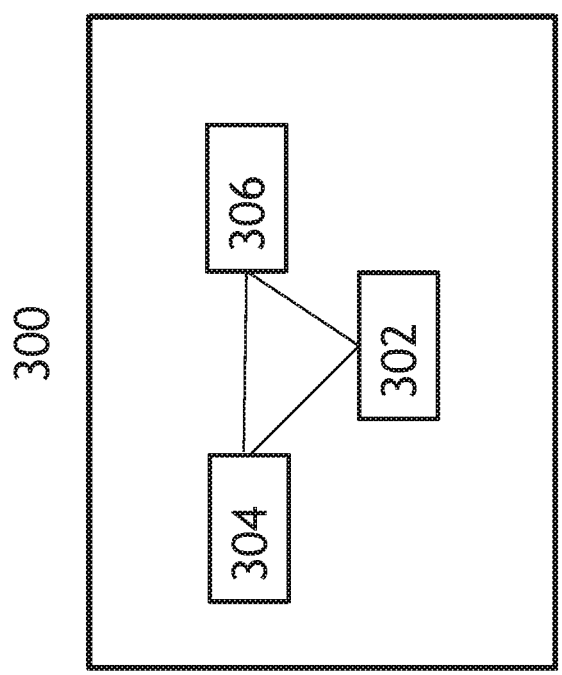
FIG. 3 illustrates a block-diagram example of an apparatus for implementing various aspects of the disclosure.

FIG. 3 depicts a high-level block diagram of a computing apparatus 300 suitable for implementing various aspects of the disclosure (e.g., one or more steps of process 200).

Although illustrated in a single block, in other embodiments the apparatus 300 may also be implemented using parallel and distributed architectures. Thus, for example, one or more of the various units of architecture 100 of FIG. 1 discussed above, such as the NE 102, the CTF 104, the distributor unit, the CDFs 121-124, the CTFs 131-134, and other components disclosed herein may be implemented using apparatus 200. Furthermore, various steps such as those illustrated in the example of process 200 may be executed using apparatus 300 sequentially, in parallel, or in a different order based on particular implementations. Exemplary apparatus 300 includes a processor 302 (e.g., a central processing unit ("CPU")), that is communicatively interconnected with various input/output devices 304 and a memory 306. Apparatus 300 may be implemented as one or more blades in a blade chassis.

The processor 302 may be any type of processor such as a general purpose central processing unit ("CPU") or a dedicated microprocessor such as an embedded microcontroller or a digital signal processor ("DSP"). The input/output devices 304 may be any peripheral device operating under the control of the processor 302 and configured to input data into or output data from the apparatus 300, such as, for example, network adapters, data ports, and various user interface devices such as a keyboard, a keypad, a mouse, or a display.

Memory 306 may be any type or combination of memory suitable for storing and accessing electronic information, such as, for example, transitory random access memory (RAM) or non-transitory memory such as read only memory (ROM), hard disk drive memory, database memory, compact disk drive memory, optical memory, etc. The memory 306 may include data and instructions which, upon execution by the processor 302, may configure or cause the apparatus 300 to perform or execute the functionality or aspects described hereinabove (e.g., one or more steps of process 200). In addition, apparatus 300 may also include other components typically found in computing systems, such as an operating system, queue managers, device drivers, database drivers, or one or more network protocols that are stored in memory 306 and executed by the processor 302.

The buckets disclosed herein may be implemented in memory 306 as one or more types or combinations of data structure(s). In one embodiment the buckets may be implemented as a data structure that is partly or fully stored in a portion of a transitory memory (e.g., RAM). In other embodiments, the buckets may be implemented as data structures that are partly or fully stored in a non-transitory memory (e.g., hard-disk). In various embodiments, the data structures may be implemented as one or more linked lists, files, tables, or database. For example, in one embodiment each bucket may be implemented as a separate table that includes fields identifying various AVPs of ACRs stored within the table, as well as fields identifying the source CTF that the table is assigned to and the current OSI attribute of the source CTF. The data structure(s) may be implemented using internal memory accessible only to a particular unit (e.g., CDF 121 to 124) described in FIG. 1, or may be implemented as a common memory shared between different units (e.g., CDFs 121-124).

A data structure may be configured as having a header portion and a data portion. The ACRs may be stored in the data portion of the data structures as they are received by the receiving CDF from a CTF. The header portion of the data structure may be populated with data that assigns a particular data structure for storing ACRs received from particular CTFs, as described above. Further, the header portion of a data structure may also include the assigned current OSI-attribute of the bucket. A receiving CDF may be configured to quickly retrieve information from the header portion of a bucket without having to search through ACRs that are stored in the data portion of the bucket. In some embodiments, a receiving CDF may also maintain a separate indexed data structure that serves as a table of contents that identifies a given CTF, references or identifies another data structure (or bucket) where ACRs received from the given CTF are stored, and identifies the current OSI Attribute value assigned to the bucket for faster processing.

While a particular embodiment of apparatus 300 is illustrated in FIG. 3, various aspects in accordance with the present disclosure may also be implemented using one or more application specific integrated circuits (ASICs), field programmable gate arrays (FPGAs), or any other combination of dedicated or programmable hardware.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A telecommunication apparatus for processing Accounting Charging Record (ACR) messages in an Offline Charging System (OFCS) of a telecommunications network, the telecommunication apparatus comprising: a memory for storing instructions and data; and, a processor configured to execute the instructions and to process the data, wherein the instructions, when executed by the processor, configure the processor to: receive a first Diameter message for a telecommunication session from a first Charging Trigger Function (CTF) over the telecommunications network; identity the first CTF as the source of the received first Diameter message and determine a first Origin State ID (OSI) reported by the first CTF from Address Value Pairs (AVPs) included in the first Diameter message, designate a first bucket for storing ACR messages received from the identified first CTF; set the first OSI as a current OSI associated with the designated first bucket; and, store the first Diameter message in the designated first bucket if the first Diameter message is an ACR message receive a second Diameter message for a telecommunication session from the first CTF over the telecommunications network; identity the first CTF as the source of the received second Diameter message and identify a second OSI reported by the first CTF from Address Value Pairs (AVPs) included in the second Diameter message, determine that the second OSI reported by the first CTF in the second Diameter message is different from the current OSI associated with the designated first bucket; designate a second bucket for storing ACR messages received from the first CTF; set the second OSI received in the second Diameter message as a current OSI associated with the designated second bucket; and, store the second Diameter message in the designated second bucket if the second Diameter message is a second ACR message.

2. The telecommunication apparatus of claim 1, wherein the processor is further configured to:
receive additional ACR messages for one or more telecommunication sessions from the first CTF over the telecommunications network, each of the additional ACR messages including AVPs indicating the identity of the first CTF and an OSI reported by the first CTF;
determine that the respective OSIs reported in the additional ACR messages are the same as the current OSI that has been associated with the designated first bucket for storing ACR messages received from the first CTF; and,
store the additional ACR messages received from the first CTF for the one or more telecommunication sessions in the designated first bucket.

3. The telecommunication apparatus of claim 1, wherein the processor is further configured to:
determine that at least one of the additional ACR messages stored in the designated first bucket is an "Stop" ACR message for a given telecommunication session for which a "Start" ACR message and one or more "Interim" ACR messages are also stored in the designated first bucket; and,
generate a complete Charging Data Record (CDR) using data included in the "Start" ACR message, the one or more "Interim" ACR messages, and the "Stop" ACR message stored in the designated first bucket for the given telecommunication session.

4. The telecommunication apparatus of claim 1, wherein the processor is further configured to:
receive additional ACR messages for one or more telecommunication sessions from the first CTF over the telecommunications network, each of the additional ACR messages including AVPs indicating the identity of the first CTF and an OSI reported by the first CTF;
determine that the respective OSIs reported in the additional ACR messages are the same as the current OSI that has been associated with the designated second bucket for storing ACR messages received from the first CTF; and,
store the additional ACR messages received from the first CTF for the one or more telecommunication sessions in the designated second bucket.

5. The telecommunication apparatus of claim 1, wherein the processor is further configured to:
designate the first bucket for storing ACR messages received from the first CTF as an obsolete bucket.

6. The telecommunication apparatus of claim 5, wherein the processor is further configured to:
generated incomplete Charging Data Records for one or more telecommunication sessions based on data included in one or more ACR messages stored in the first bucket.

7. The telecommunication apparatus of claim 1, wherein the processor is configured to receive and store respective ACR messages received from different CTFs over the telecommunications network in different designated buckets, each of the respective different designated buckets being associated with each different CTF and being associated with an OSI reported by each different CTF in one or more ACR messages.

8. The telecommunication apparatus of claim 1, wherein the telecommunication apparatus is communicatively coupled to one or more Network Elements of the telecommunications network.

9. The telecommunication apparatus of claim 1, wherein the telecommunication apparatus is implemented as part of the Offline Charging System for the telecommunications network.

10. A method for processing messages in an offline charging system, the method comprising: receiving a first Diameter message for a telecommunication session from a first Charging Trigger Function (CTF) over the telecommunications network; identifying the first CTF as the source of the received first Diameter message and determine a first Origin State ID (OSI) reported by the first CTF from Address Value Pairs (AVPs) included in the first Diameter message, designating a first bucket for storing ACR messages received from the identified first CTF; setting the first OSI as a current OSI associated with the designated first bucket; and, storing the first Diameter message in the designated first bucket if the first Diameter message is an ACR message receiving a second Diameter message for a telecommunication session from the first CTF over the telecommunications network; identifying the first CTF as the source of the received second Diameter message and identify a second OSI reported by the first CTF from Address Value Pairs (AVPs) included in the second Diameter message, determining that the second OSI reported by the first CTF in the second Diameter message is different from the current OSI associated with the designated first bucket; designating a second bucket for storing ACR messages received from the first CTF; setting the second OSI received in the second Diameter message as a current OSI associated with the designated second bucket; and, storing the second Diameter message in the designated second bucket if the second Diameter message is an ACR message.

11. The method of claim 10, the method further comprising:
receiving additional ACR messages for one or more telecommunication sessions from the first CTF over the telecommunications network, each of the additional ACR messages including AVPs indicating the identity of the first CTF and an OSI reported by the first CTF;
determining that the respective OSIs reported in the additional ACR messages are the same as the current OSI that has been associated with the designated first bucket for storing ACR messages received from the first CTF; and,
storing the additional ACR messages received from the first CTF for the one or more telecommunication sessions in the designated first bucket.

12. The method of claim 10, the method further comprising:
determining that at least one of the additional ACR messages stored in the designated first bucket is an "Stop" ACR message for a given telecommunication session for which a "Start" ACR message and one or more "Interim" ACR messages are also stored in the designated first bucket; and,
generating a complete Charging Data Record (CDR) using data included in the "Start" ACR message, the one or more "Interim" ACR messages, and the "Stop" ACR message stored in the designated first bucket for the given telecommunication session.

13. The method of claim 10, the method further comprising:
receiving additional ACR messages for one or more telecommunication sessions from the first CTF over the telecommunications network, each of the additional ACR messages including AVPs indicating the identity of the first CTF and an OSI reported by the first CTF;
determining that the respective OSIs reported in the additional ACR messages are the same as the current OSI that has been associated with the designated second bucket for storing ACR messages received from the first CTF; and,
storing the additional ACR messages received from the first CTF for the one or more telecommunication sessions in the designated second bucket.

14. The method of claim 10, the method further comprising:
designating the first bucket for storing ACR messages received from the first CTF as an obsolete bucket.

15. The method of claim 14, the method further comprising:
generating incomplete Charging Data Records for one or more telecommunication sessions based on data included in one or more ACR messages stored in the first bucket.

16. The method of claim 10, wherein the method further comprises receiving and storing respective ACR messages received from different CTFs over the telecommunications network in different designated buckets, each of the respective different designated buckets being associated with each different CTF and being associated with an OSI reported by each different CTF in one or more ACR messages.

* * * * *